United States Patent [19]
Bayer

[11] Patent Number: 4,577,176
[45] Date of Patent: Mar. 18, 1986

[54] TEMPERATURE REGULATING DEVICE

[75] Inventor: Helmut Bayer, Vienna, Austria

[73] Assignee: Electrovac Gesellschaft m.b.H., Vienna, Austria

[21] Appl. No.: 565,552

[22] Filed: Dec. 27, 1983

[30] Foreign Application Priority Data

Jan. 5, 1983 [AT] Austria .................................. 31/83

[51] Int. Cl.⁴ ............................................. H01H 37/48
[52] U.S. Cl. ..................................... 337/394; 219/449; 219/464; 219/512; 337/382
[58] Field of Search ...................... 219/446, 449.4, 461, 219/463, 464, 512; 337/382, 386, 393, 394, 396; 403/254, 353

[56] References Cited

U.S. PATENT DOCUMENTS

| | | | |
|---|---|---|---|
| 1,945,706 | 2/1934 | Thermostat | 337/393 |
| 2,705,746 | 4/1955 | Strange | 337/393 X |
| 2,809,523 | 10/1957 | Burling | 337/394 X |
| 3,732,518 | 5/1973 | Them et al. | 337/394 |
| 3,906,424 | 9/1975 | Clancy et al. | 337/394 |
| 4,008,454 | 2/1977 | Bowling | 337/386 |
| 4,215,332 | 7/1980 | Wharton | 337/394 |
| 4,327,280 | 4/1982 | McWilliams | 219/464 |
| 4,347,432 | 8/1982 | Gössler | 219/449 |
| 4,350,875 | 9/1982 | McWilliams | 219/449 |
| 4,430,558 | 2/1984 | McWilliams | 219/449 |

FOREIGN PATENT DOCUMENTS

| | | | |
|---|---|---|---|
| 713182 | 7/1965 | Canada | 337/394 |
| 2627373 | 12/1977 | Fed. Rep. of Germany | 219/449 |
| 2748109 | 5/1979 | Fed. Rep. of Germany | 219/449 |
| 3100758 | 9/1982 | Fed. Rep. of Germany | 219/449 |
| 2069300 | 8/1981 | United Kingdom . | |

Primary Examiner—Volodymyr Y. Mayewsky
Attorney, Agent, or Firm—Martin A. Farber

[57] ABSTRACT

A temperature regulating device is provided for electrical cooking appliances wherein the heat is provided by heating bodies, or elements, for plural heating zones. The device has a heat resistant bar or rod of high thermal expansion. The rod is enclosed within a tubular jacket formed of two tubes set end-to-end along the rod. The rod is spring mounted for moving an electrical contact of a switch to open and close the switch. The tubes have different coefficients of thermal expansion, the coefficient of the tube nearest the switch being the same as that of the rod, for providing a uniform switching characteristic over a wide range of operation of the heating elements.

9 Claims, 4 Drawing Figures

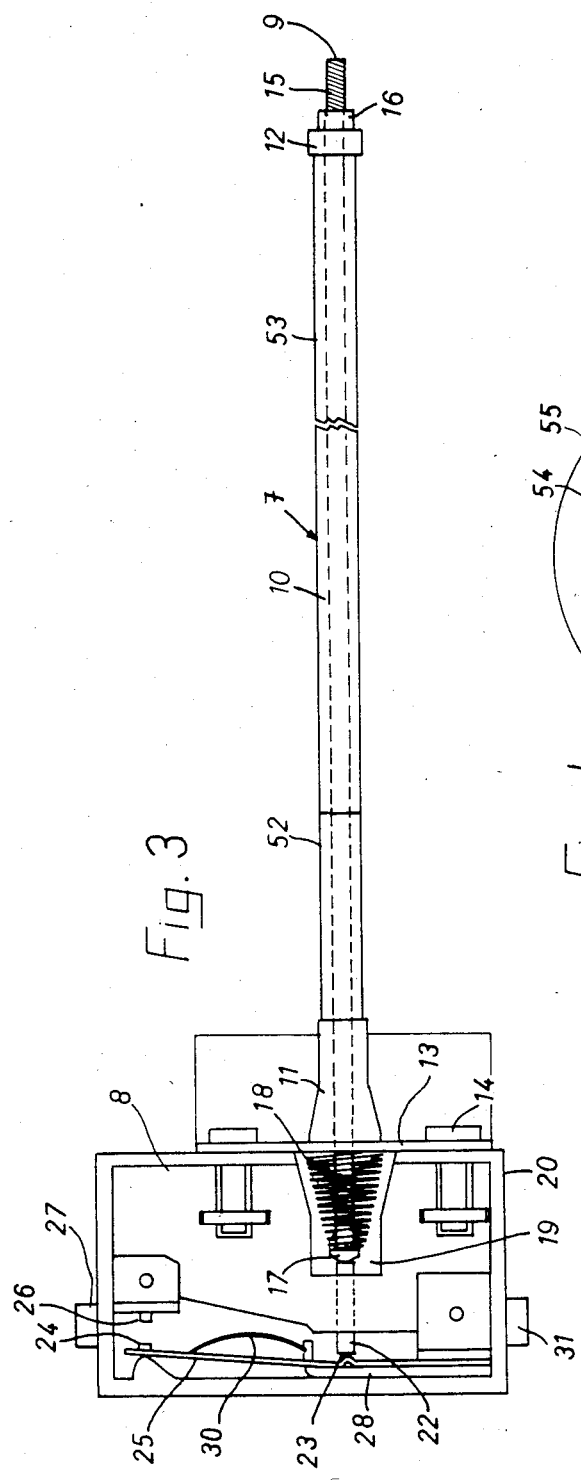

TEMPERATURE REGULATING DEVICE

The present invention relates to a device for regulating or limiting at least one temperature value or temperature range of radiant or contact heating bodies of electrical cooking appliances in combination with cooking surfaces consisting of metal, glass-ceramic or the like, each heating body comprising at least two heating zones and at least one temperature sensor being arranged between the heating body and the cooking surface in order to regulate or limit the temperature of the heating body or bodies, the temperature sensor having a bar of high thermal expansion which is contained in a tube, one end of the bar being in communication with a switch contact system which serves for regulating or limiting the temperature of the heating body.

The regulating or limiting of the temperature in the case of a device of the above type is effected, in particular, in the manner that axial movement of the bar-shaped temperature sensor which is produced by the temperature is used to actuate the contact system in such a manner that the electrical heating circuit is connected at a given temperature and then disconnected at a given higher temperature.

If the radiation or contact heating body of such a device has several operating conditions, then there are different switch points for each operating condition, which is not desirable for the regulating or limiting, in particular, of a single temperature range.

This condition could be remedied by designing the contact system as a multi-circuit switch system having a number of switches corresponding to the number of operating conditions, but this would mean an uneconomically high technical expense.

From West German No. 31 02 919 A1 an overheat safety switch is known which consists of strips or wires of different coefficients of expansion, they together forming a bimetallic element which actuates a mechanical switch. This bimetallic element is arranged within a quartz tube which is developed as a single continuous piece and serves the function merely of protecting the bimetallic element. In order to shield the bimetallic element from the influence of the heat from a connected (second) heating element, the region of the quartz tube which is located above this heating element is, according to this prior art, heat-insulated in the manner that this region of the quartz tube is surrounded by a block of thermally insulating material. In order to improve this heat insulation it has been proposed that a copper tube which is connected to a heat sink be furthermore pushed over the region of the quartz tube which is to be insulated. Overheat switches of this type have the disadvantage of being complicated in construction and, despite the heat insulation, the radiant heat of a heating zone—which is narrowly limited locally—can never be completely screened off. Furthermore, difficulties with respect to the precision of the temperature switching behavior are always presented by bimetallic elements.

The object of the invention is to improve a device of the aforementioned type in such a manner that, while maintaining a structurally simple construction, the switching behavior of the bar-shaped temperature sensor remains at all times substantially the same regardless of the instantaneous condition of operation of the radiation or contact heating body or bodies.

In accordance with the invention, this purpose is achieved in the manner that the tube is formed of two or more tube lengths which are arranged axially one behind the other, at least one tube length in each case being associated with each heating zone in such a manner that direct action of heat from each heating zone on the length of tube associated with it is assured, at least two of said tube lengths having thermal expansions which differ from each other within the temperature range of between 20° C. and 700° C. but the total expansion of the tube formed of tube lengths is less than the thermal expansion of the bar within this temperature range. With such a divided development of the tube which receives the bar, it is possible, when using partial lengths of different expansion, in a very simple manner and with minimum additional expense, to assure a dependable exclusion of "disturbing" influences of the one heating zone on the partial length which traverses the other heating zone or on the temperature sensor which controls the other heating zone. By the simple structural development of the bar-shaped temperature sensor of the invention, precise regulation and limiting of the selected temperature or temperature range is assured regardless of whether one or more heating zones are in operation.

Another advantageous embodiment of the invention is characterized by the fact that the coefficient of thermal expansion of the material of at least one partial length of the tube which lies within the region of a heating zone is within a range which amounts to ±20% of the coefficient of thermal expansion of the material of the bar. As a result, the heating zone which lies within the region of this partial length remains definitely without effect on the switching points of the temperature sensor. By the selection of an amount of about ±20% for the difference between the coefficient of thermal expansion of the partial length and the coefficient of thermal expansion of the material of the bar, it is possible to obtain compensation of the temperature variations, which occur due to a change in the operating conditions of the radiation or contact heating members, as, for instance, by the connecting of a second heating zone to the first heating zone which is already in operation.

The greater this difference between the coefficient of thermal expansion of the length of tube and that of the material of the bar, the more the switch point will be shifted towards higher control temperatures. In this way, the further advantage is obtained that the heat loss of the outermost heating circuit resulting from radiation can be reduced and an approximately constant heat profile be obtained over the entire heating surface, i.e. over all heating zones which are active in this condition of operation.

If particularly high demands as to a constant heat profile are not made, and/or the size in radial direction of the heating zone having the greatest heat radiation losses is only small, it has been found particularly advantageous, as a further development of the invention, for the coefficient of thermal expansion of the material of at least one length of tube present in the region of a heating zone to be at least approximately equal to the coefficient of thermal expansion of the material of the bar. In this way there is also obtained the technological advantage that the same material can be used for the bar and the length of tube.

Since any junction between the individual lengths of tube entails the danger of a voltage flashover from the metallically conductive bar to the uninsulated heating coil which is at operating voltage, it has been found particularly advantageous, in order to minimize the junction points if, as a further development of the invention, the tube of the bar-shaped temperature sensor consists of two partial lengths.

When two heating zones are present it is also particularly advantageous, in order to minimize the number of junction points if, in accordance with another embodiment of the invention, one length of tube is associated with the entire one heating zone while the second length of tube is associated with only a part of the other heating zone.

Another advantageous embodiment of the invention can also consist therein that a separate temperature sensor having at least two tube lengths is associated with each heating zone and that, in each temperature sensor, those tube lengths which lie in the region of the heating zone associated with said sensor have a coefficient of thermal expansion which is different than that of the material of the bar. In this way, the possibility is created of regulating the two heating zones independently of each other in such a way that the heating zones do not exert a detrimental effect on the temperature sensors.

The invention is described below by way of example with reference to the drawings, in which FIG. 1 is a section along the line I—I of FIG. 2 through a cooking appliance with a temperature regulating device in accordance with the invention;

FIG. 3 is a side view of an enlarged device in accordance with the invention, and FIG. 4 is a diagrammatic view of another embodiment of a device in accordance with the invention.

Figure 1:
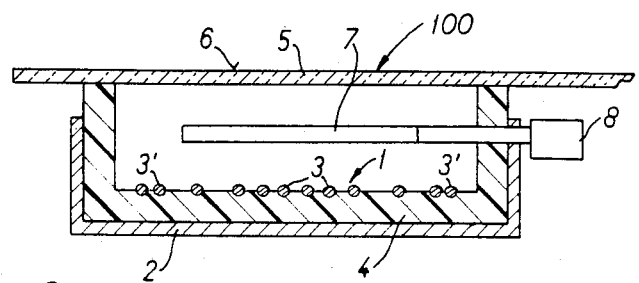
Figure 2:
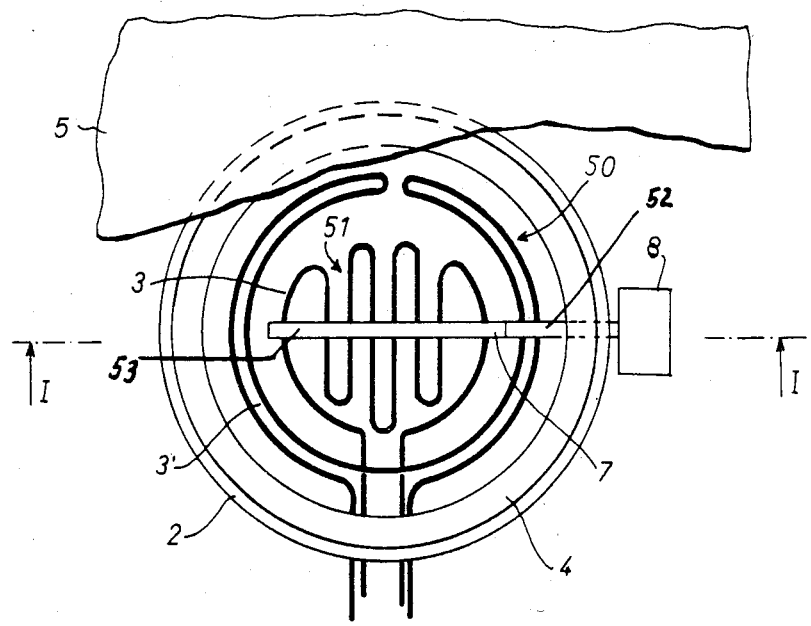
FIG. 2 is a top view of the device of FIG. 1 with a portion of a cover plate cut away to show the heater and regulating device.

FIGS. 1 and 2 show an electric appliance 100 having a radiation heating element or body 1 which consists of a cup 2 containing two heating zones 50, 51, each having a heating coil 3, 3' the coils being embedded in an encapsulating composition 4. The radiation heating body 1 is arranged below a plate 5 of metal, glass-ceramic or the like which forms the cooking surface 6. Between the cooking plate 5 and the heating coils 3 and 3' there is a temperature sensor 7 incorporating the invention and which is connected to a switch head 8 having a contact system, the temperature sensor 7 being passed in simple fashion through a hole in the radiation heating body 1.

The temperature sensor 7 is thus exposed to the temperature which prevails below the cooking surface 6 in the radiation space between the cooking surface 6 and the heating coils 3 and 3'.

In FIG. 3, the device for the regulating or limiting of the temperature which has the temperature sensor 7 and the switch head 8 is shown separately from the heating body.

The temperature sensor 7 has a bar 9 of a material of high temperature resistance and high coefficient of thermal expansion, for instance a nickel-chrome alloy or an FeCr alloy, which is arranged in two partial lengths 52, 53 of a tube 10. The one partial length 53 consists of a material of high temperature resistance and low coefficient of thermal expansion, for instance quartz-glass or ceramic, which forms a sheath for the bar 9. The individual length 52 of the tube 10 which is closer to the switch head 8 and also surrounds the bar 9 is formed of a material which has a coefficient of thermal expansion approximately equal to that of the bar 9 and, in particular, consists of the same material. The ends of the tube 10 bear caps 11, 12, the cap 11 resting against the base plate 13 which is bolted by bolts 14 to the switch head 8. The bar 9 passes through holes in the cap 11, the base plate 13 and the cap 12 and, on the end located at the cap 12, has a thread 15 onto which a nut 16 is screwed, the nut resting against the cap 12. The other end of the bar 9 has a dished collar 17. Between the collar 17 and the base plate 13, and thus between the collar 17 and the one end of the tube 10 which contains the bar 9, there is a compression spring 18 which holds the bar 9 under tensile stress and thus presses the nut 16 against the outside of the cap 12.

The bar 9, the two individual lengths 52, 53 of the tube 10, the caps 11, 12, the nut 16, the base plate 13 and the compression spring 18 form the temperature sensor, which is screwed by the screws 14 to the switch head 8, the switch head 8 having a recess 19 into which the end of the bar 9 which has the compression spring 18 is inserted.

The switch head 8 forms a housing 20 which is open on the top, the open top being adapted to be covered by a cover plate. The inside of the housing 20 is in communication with the recess 19 via a hole which extends at least approximately coaxially to the bar 9 and within which there is a transmission member 22 which is axially displaceable in the hole. The one end of the transmission member 22 rests against the dished surface of the collar 17.

The transmission member 22 has an actuating surface 23 for actuating the contact system which serves to control or limit the temperature, said system having a contact spring 25 which bears the moving contact 24 and a terminal lug 27 which has the fixed contact 26. The contact spring 25 is firmly attached to a spring holder 28 which also bears a contact spring 30, is connected in electrically conductive fashion to a terminal lug 31, and is fastened by a rivet to the switch head 8.

In the condition shown in FIG. 3, the contacts 24, 26 are open and the heating circuit is thus also open.

If the heating circuit is connected to supply voltage, then the heating coil 3 of the heating body is heated as a result of which the temperature increases in the space between the cooking surface 6 and the heating coil 3. The bar 9 expands, so that the transmission member 22 is moved towards the point of actuation of the contact spring 25. When the temperature within the space between the cooking surface 6 and the heating coil 3 reaches a value, for instance, of 700° C., the actuating surface 23 of the transmission member 22 strikes against the contact spring 25, the contacts 24, 26 being suddenly opened so that the heating is disconnected. When, during the course of the following cooling, the bar 9 contracts in length, the contact spring 25 snaps back into the position in which the contacts 24, 26 are closed.

This cycle is repeated as long as the heating circuit is connected to the supply voltage. When it is disconnected from the latter, the contacts 24, 26 will close during the course of the cooling but no new heating will take place any longer so that the bar 9 becomes constantly shorter.

As mentioned, the contact system 24, 26 is adjusted by turning the nut 16 on the thread of the bar 9 for a given temperature which is to be produced by the heating body 1. Of course, any other known adjustment measures or devices can also be used, such as adjustable screws, squeeze plates or the like.

Since the partial length 53 of quartz-glass which is further away from the switch head 8—as shown in FIG. 2—extends merely within the region of the inner heating zone 51 and the other partial length 52 which has a high coefficient of thermal expansion is arranged only in the region of the outer heating zone 50, the temperature regulation of the inner heating zone 51 can be effected without being influenced by the outer heating zone 50. Should the outer heating zone 50 be connected and give off heat, then the partial length 52 present in that region expands approximately just as much as the partial length of the bar 9 present in this region so that there is no relative movement between partial length 52 and the partial length of the bar 9 and thus also no effect on the switch contact. The temperature control can therefore be carried out undisturbed, in the manner described above.

FIG. 4 shows diagrammatically the independent regulation of two heating zones 54 and 55 by two temperature-regulation devices 56, 57 of the type described in FIG. 3. The one device 56 extends over both heating zones 55, 54, a partial length 58 of quartzglass being arranged in each case in the region of the outer heating zone 25 and, between same, a partial length 59 of a material of a high coefficient of thermal expansion. The other device 57 for the temperature control extends over the entire inner heating zone 54 within the region of which a partial length 60 of quartzglass is provided. In the partial region transversing the outer heating zone 55 there is arranged a partial length 61 of a material of high coefficient of thermal expansion. In this way, the one device 57 can, uninfluenced by the outer heating zone 55, regulate the inner heating zone 54. On the other hand, the second device 56 can, uninfluenced by the inner heating zone 54, regulate the outer heating zone 55.

The invention is not limited to the embodiments shown in the drawing. Thus the device can also be developed as a temperature limiter in which the contact system which controls the heating temperature opens the heating circuit when a maximum temperature is reached and does not automatically reconnect it. In the same way, as many heating zones as desired can be provided.

I claim:

1. A device for regulating temperature of a heat source in a heating appliance wherein a heat source provides plural heating zones, the heat source including heating elements, the appliance having a heating surface; said device comprising:
   at least one temperature sensor disposed between said heat source and said heating surface;
   an electrical contact system for switchably energizing said heat source for regulation of the temperature thereof, and an electrically insulating housing supporting said contact system at an inner end of said temperature sensor;
   said temperature sensor having a bar with a sufficiently high coefficient of thermal expansion for operating said contact system, said temperature sensor further comprising a tube which encloses said bar and connects therewith at an outer end of said sensor, one end of said bar being in communication with said contact system for regulation of the temperature of said heat source; and wherein
   the tube is formed of at least two tube lengths arranged serially one behind the other along an axis of the tube at locations corresponding to sites of respective ones of the heating zones to insure direct action of heat by each heating zone on the corresponding tube length, opposite ends of the tube being electrically insulated from each other, each of said tube lengths being exposed to heat from a plurality of said heating zones; and
   at least two of said tube lengths have a thermal expansion different from each other within the temperature range between 20° C. and 700° C., the total expansion of the tube formed of said tube lengths being less than the thermal expansion of the bar within said temperature range.

2. A device according to claim 1, characterized by the fact that the coefficient of thermal expansion of the material of at least one tube length lying within the region of a heating zone lies in a range which amounts to ±20% of the coefficient of thermal expansion of the material of the bar.

3. A device according to claim 1, wherein
   the coefficient of thermal expansion of the material of at least one of said tube lengths lying in the region of a respective one of said heating zones is at least approximately equal to the coefficient of thermal expansion of the material of the bar.

4. A device according to claim 1, wherein
   said plural heating zones include two ring-shaped heating zones, one of said tube lengths responds to heat emitted by all of one of said circular heating zones and a second of said tube lengths responds to heat emitted by a part of the second of said heating zones.

5. A device according to claim 1 further comprising a second temperature sensor, and wherein
   each of said heating zones has one of said temperature sensors, each of which has said at least two tube lengths, and those of said tube lengths of each said temperature sensor which lie in the region of the heating zone associated therewith have a coefficient of thermal expansion which differs from that of the material of the bar.

6. A device for regulating temperature of a heat source in an electrical appliance wherein the heat source provides plural heating zones, the heat source including heating bodies which produce heat in said appliance, the device comprising:
   an electrical switch for applying electrical current to said source;
   a rod extending into a plurality of the heating zones, the rod having a sufficiently high coefficient of thermal expansion for operating a contact of said switch in response to the temperature present in one of said heating zones;
   a tube enclosing said rod, opposite ends of said tube being electrically insulated from each other, said tube comprising a first tubular section having a first coefficient of thermal expansion and a second tubular section having a second coefficient of thermal expansion, said tubular sections being arranged serially along an axis of the tube with each of said tubular sections being in a different one of said heating zones; and wherein
   said rod and said tube comprise a sensor of temperature of heat in said appliance, said device further comprising an electrically insulating housing supporting said switch means at an inner end of said sensor, said rod and said tube being connected together at an outer end of said sensor, said rod and said tube are operatively coupled to said switch for actuating said switch in response to temperature, and said first and said second coefficients of said tubular sections differ in value to provide uniform operation of said device over a range of temperature in each of said heating zones, the total expansion of the tube formed by said tubular sections being less than the thermal expansion of said rod within said temperature range, and wherein each of said tubular sections is exposed to heat from a plurality of said heating zones.

7. A device according to claim 6 wherein
said first coefficient is equal to that of said rod, said first tubular section being disposed between said switch and said second tubular section.

8. A device according to claim 7 wherein
said rod expands upon heating to move the contact to open said switch for termination of said current upon rising temperature.

9. A device for regulating temperature of a heat source in a heating appliance wherein the heat source provides plural heating zones, there being a heating element of said source in each of said zones for producing heat in said appliance, said device comprising:
switch means for activating a flow of power to said source for the production of heat therefrom;
a rod extending into a plurality of the heating zones, the rod having a sufficiently high coefficient of thermal expansion for actuating said switch means in response to the temperature present in one of said heating zones;
a tube enclosing said rod, said tube comprising a first tubular section having a first coefficient of thermal expansion and a second tubular section having a second coefficient of thermal expansion, said first and said second tubular sections being arranged serially along an axis of the tube with each of said tubular sections being in a different one of said heating zones; and wherein
said rod and said tube comprise a sensor of temperature of heat in said appliance, said device further comprises a housing supporting said switch means at an inner end of said sensor, said rod and said tube being connected together at an outer end of said sensor, said rod and said tube are operatively coupled to said switch means for actuating said switch means in response to temperature, said first and said second coefficients of said tubular sections differ in value to provide uniform operation of said device over a range of temperature in each of said heating zones, the total expansion of the tube formed by said first and said second tubular sections being less than the thermal expansion of said rod within said temperature range, and wherein each of said tubular sections is exposed to heat from a plurality of said heating zones.

* * * * *